(12) United States Patent
Sawamoto

(10) Patent No.: US 11,314,042 B2
(45) Date of Patent: Apr. 26, 2022

(54) OPTICAL SYSTEM FOR IMAGE PICKUP, AND IMAGE PICKUP DEVICE

(71) Applicant: NITTOH INC., Suwa (JP)

(72) Inventor: Akira Sawamoto, Nagano (JP)

(73) Assignee: NITTOH INC., Suwa (JP)

( * ) Notice: Subject to any disclaimer, the term of this patent is extended or adjusted under 35 U.S.C. 154(b) by 65 days.

(21) Appl. No.: 16/614,902

(22) PCT Filed: May 25, 2018

(86) PCT No.: PCT/JP2018/020089
§ 371 (c)(1),
(2) Date: Nov. 19, 2019

(87) PCT Pub. No.: WO2018/216789
PCT Pub. Date: Nov. 29, 2018

(65) Prior Publication Data
US 2020/0192060 A1 Jun. 18, 2020

(30) Foreign Application Priority Data
May 26, 2017 (JP) .............................. JP2017-104151

(51) Int. Cl.
*G02B 9/12* (2006.01)
*G02B 13/02* (2006.01)
*H04N 5/225* (2006.01)

(52) U.S. Cl.
CPC .............. *G02B 9/12* (2013.01); *G02B 13/02* (2013.01); *H04N 5/2254* (2013.01)

(58) Field of Classification Search
CPC .......... G02B 9/00–36; G02B 13/00–26; G02B 15/00–28; G02B 9/1214; G02B 9/60;
(Continued)

(56) References Cited

U.S. PATENT DOCUMENTS

2010/0302640 A1\* 12/2010 Take ..................... G02B 15/14
359/557
2010/0321791 A1\* 12/2010 Hayakawa ........... G02B 15/173
359/684
(Continued)

FOREIGN PATENT DOCUMENTS

JP 2000-214380 A 8/2000
JP 2011-048232 A 3/2011
(Continued)

OTHER PUBLICATIONS

PCT, Japan Patent Office (ISA/JP), International Search Report (with English translation), International Application No. PCT/JP2018/020089, 3 pages, dated Aug. 7, 2018.

*Primary Examiner* — Marin Pichler
*Assistant Examiner* — Alberto J Betancourt
(74) *Attorney, Agent, or Firm* — Thompson Hine LLP

(57) ABSTRACT

An optical system (10) for image pickup includes a first refractive optical system (Si) disposed on an object side with respect to an aperture stop (St) and a second refractive optical system (S2) disposed on an image plane side with respect to the aperture stop. The first refractive optical system includes, in order from the object side (11), a first lens group (G1) with positive refractive power, a second lens group (G2) with positive refractive power, and a third lens group (G3) with negative refractive power. The second refractive optical system includes, in order from the object side (11), a fourth lens group (G4) with positive refractive power, a fifth lens group (G5) with positive refractive power, and a sixth lens group (G6) with negative refractive power. When focusing from infinity to a short distance, the second lens group and the fourth lens group move toward the object side.

18 Claims, 12 Drawing Sheets

(58) Field of Classification Search
CPC .......... G02B 9/62; G02B 9/64; G02B 15/142;
G02B 15/1421; G02B 15/1425; G02B
15/143; G02B 15/144; G02B 15/145;
G02B 15/146; G02B 15/1461
USPC ................ 359/676–706, 708–718, 745–795;
348/240.99, 240.2, 240.3
See application file for complete search history.

(56) References Cited

U.S. PATENT DOCUMENTS

| | | | | |
|---|---|---|---|---|
| 2012/0075715 | A1* | 3/2012 | Kon | G02B 15/1461 |
| | | | | 359/683 |
| 2012/0105683 | A1* | 5/2012 | Yoshinaga | G02B 13/04 |
| | | | | 359/557 |
| 2013/0120640 | A1* | 5/2013 | Taki | G02B 15/16 |
| | | | | 359/684 |
| 2013/0148005 | A1* | 6/2013 | Imaoka | G02B 15/22 |
| | | | | 359/557 |
| 2014/0009652 | A1* | 1/2014 | Sugita | G02B 15/14 |
| | | | | 359/684 |
| 2015/0130985 | A1* | 5/2015 | Kawamura | G02B 13/02 |
| | | | | 348/345 |
| 2017/0082841 | A1* | 3/2017 | Iwasawa | G02B 15/1461 |
| 2017/0090169 | A1* | 3/2017 | Noda | G02B 13/04 |
| 2017/0160526 | A1* | 6/2017 | Okumura | G02B 15/20 |
| 2017/0343780 | A1* | 11/2017 | Lee | G02B 13/146 |
| 2019/0018229 | A1* | 1/2019 | Miyagawa | G02B 13/18 |

FOREIGN PATENT DOCUMENTS

| | | |
|---|---|---|
| JP | 2013-104994 A | 5/2013 |
| JP | 2014-219601 A | 11/2014 |
| JP | 2016-118770 A | 6/2016 |
| WO | 2016/113921 A1 | 7/2016 |

* cited by examiner

Fig. 2

| No. | Rdy | Thi (mm) | H*2 (mm) | nd | vd | LENS | FOCAL LENGTH (mm) |
|---|---|---|---|---|---|---|---|
| 0 | Flat | INFINITY | | | | | |
| 1 | 279.30100 | 4.00000 | 42.00 | 1.91650 | 31.60 | L11 | G1 151.76 |
| 2 | -279.30100 | 7.47455 | 42.00 | | | | |
| 3 | 32.19900 | 8.00000 | 32.00 | 1.48749 | 70.24 | L21 | |
| 4 | -88.84300 | 1.00000 | 30.80 | 1.74077 | 27.79 | L22 | G2 167.88 |
| 5 | 35.38700 | 1.30000 | 28.80 | | | | |
| 6 | 52.31900 | 4.00000 | 28.80 | 1.91650 | 31.60 | L23 | |
| 7 | 232.96300 | 2.79553 | 28.20 | | | | |
| 8 | -225.64800 | 4.25000 | 26.50 | 1.89286 | 20.36 | L31 | G3 -68.55 |
| 9 | -38.54400 | 1.00000 | 26.10 | 1.66680 | 33.05 | L32 | |
| 10 | 40.65000 | 7.88000 | 24.40 | | | | |
| 11 | Flat | 32.21822 | 24.30 | | | St | |
| 12 | 77.41500 | 6.30000 | 34.00 | 1.48749 | 70.24 | L41 | G4 80.20 |
| 13 | -77.41500 | 16.27932 | 34.30 | | | | |
| 14 | -151.22000 | 1.00000 | 38.40 | 1.80000 | 29.84 | L51 | G5 128.21 |
| 15 | 71.37700 | 7.60000 | 39.40 | 1.91650 | 31.60 | L52 | |
| 16 | -81.79000 | 6.91461 | 39.80 | | | | |
| 17 | -51.15000 | 7.06000 | 40.00 | 1.69895 | 30.13 | L61 | G6 -70.53 |
| 18 | 1831.33800 | 34.02773 | 40.00 | | | | |
| 19 | Flat | 1.80000 | 58.00 | 1.51633 | 64.14 | COVER | |
| 20 | Flat | 0.10000 | 58.00 | | | | |
| 21 | Flat | | | | | | |

Fig. 3

| OBJECT DISTANCE | INFINITY | 2.0m | 0.43m |
|---|---|---|---|
| THI 2 | 7.47455 | 6.64693 | 0.80000 |
| THI 7 | 2.79553 | 3.62310 | 9.47007 |
| THI 11 | 32.21822 | 27.56595 | 4.57709 |
| THI 13 | 16.27932 | 20.87680 | 33.19616 |
| THI 16 | 6.91461 | 6.96945 | 17.63887 |
| FOCAL LENGTH (mm) | 120.0000 | 114.3498 | 81.0000 |
| F NUMBER | 3.5000 | 3.3061 | 2.1799 |
| MAGNIFICATION | 0.0000 | 0.0658 | 0.5000 |
| OBJECT DISTANCE (mm) | INFINITY | 2000.0000 | 427.4341 |
| ANGLE OF VIEW | 13.2° | 12.7° | 9.58° |

Fig. 6

| No. | Rdy | Thi (mm) | H*2 (mm) | nd | vd | LENS | FOCAL LENGTH (mm) |
|---|---|---|---|---|---|---|---|
| 0 | Flat | INFINITY | | | | | |
| 1 | 265.46500 | 4.05000 | 42.00 | 1.85026 | 32.27 | L11 | G1 155.52 |
| 2 | -265.46500 | 9.65052 | 42.00 | | | | |
| 3 | 43.71000 | 7.05000 | 32.00 | 1.53775 | 74.70 | L21 | |
| 4 | -75.47200 | 1.00000 | 31.20 | 1.74077 | 27.79 | L22 | G2 183.92 |
| 5 | 36.65500 | 0.77315 | 29.70 | | | | |
| 6 | 40.36100 | 4.40000 | 29.80 | 1.91650 | 31.60 | L23 | |
| 7 | 124.21600 | 5.15475 | 29.20 | | | | |
| 8 | 17080.49126 | 4.35000 | 26.80 | 1.89286 | 20.36 | L31 | G3 -87.39 |
| 9 | -45.12400 | 1.65000 | 26.30 | 1.67270 | 32.10 | L32 | |
| 10 | 40.87900 | 7.93376 | 24.50 | | | | |
| 11 | Flat | 45.01010 | 23.02 | | | St | |
| 12 | 88.12400 | 6.20000 | 36.00 | 1.48749 | 70.24 | L41 | G4 91.13 |
| 13 | -88.12400 | 0.80000 | 36.80 | | | | |
| 14 | -333.14600 | 1.00000 | 37.50 | 1.80000 | 29.84 | L51 | G5 146.52 |
| 15 | 40.80300 | 8.60000 | 38.80 | 1.91650 | 31.60 | L52 | |
| 16 | -144.77700 | 11.23909 | 39.00 | | | | |
| 17 | -61.95200 | 2.00000 | 38.70 | 1.69895 | 30.13 | L61 | G6 -76.04 |
| 18 | 401.06800 | 31.25575 | 40.00 | | | | |
| 19 | Flat | 1.80000 | 58.00 | 1.51633 | 64.14 | COVER | |
| 20 | Flat | 0.10000 | 58.00 | | | | |
| 21 | Flat | | | | | | |

Fig. 7

| OBJECT DISTANCE | INFINITY | 2.0m | 0.43m |
|---|---|---|---|
| THI 2 | 9.65052 | 8.84413 | 1.41023 |
| THI 7 | 5.15475 | 5.96115 | 13.39504 |
| THI 11 | 45.01010 | 37.35039 | 4.62225 |
| THI 13 | 0.80000 | 10.09897 | 42.19990 |
| THI 16 | 11.23909 | 9.59983 | 10.22703 |
| FOCAL LENGTH (mm) | 120.0000 | 113.6106 | 81.0000 |
| F NUMBER | 3.5000 | 3.2880 | 2.1560 |
| MAGNIFICATION | 0.0000 | 0.0650 | 0.5000 |
| OBJECT DISTANCE (mm) | INFINITY | 2000.0000 | 429.9341 |
| ANGLE OF VIEW | 13.2° | 12.8° | 9.23° |

Fig. 10

| No. | Rdy | Thi (mm) | H*2 (mm) | nd | vd | LENS | FOCAL LENGTH (mm) |
|---|---|---|---|---|---|---|---|
| 0 | Flat | INFINITY | | | | | |
| 1 | 417.91000 | 3.42000 | 45.60 | 1.91650 | 31.60 | L11 | G1 226.74 |
| 2 | -417.91000 | 11.32281 | 40.90 | | | | |
| 3 | 44.22399 | 6.60000 | 32.00 | 1.53775 | 74.70 | L21 | |
| 4 | -92.66600 | 1.00000 | 31.20 | 1.74077 | 27.79 | L22 | G2 142.29 |
| 5 | 31.71400 | 0.52000 | 29.60 | | | | |
| 6 | 34.16403 | 5.00000 | 29.60 | 1.91650 | 31.60 | L23 | |
| 7 | 129.95800 | 4.03469 | 28.90 | | | | |
| 8 | 774.27100 | 4.05000 | 28.90 | 1.89286 | 20.36 | L31 | G3 -93.78 |
| 9 | -58.65400 | 1.00000 | 28.10 | 1.66680 | 33.05 | L32 | |
| 10 | 42.35600 | 11.66000 | 26.30 | | | | |
| 11 | Flat | 33.23319 | 24.60 | | | St | |
| 12 | 83.26600 | 5.96944 | 34.00 | 1.48749 | 70.24 | L41 | G4 86.13 |
| 13 | -83.26600 | 0.80435 | 34.70 | | | | |
| 14 | -353.73200 | 1.20000 | 35.70 | 1.80000 | 29.84 | L51 | G5 225.37 |
| 15 | 90.67100 | 5.00000 | 36.10 | 1.91650 | 31.60 | L52 | |
| 16 | -170.92900 | 17.33000 | 36.30 | | | | |
| 17 | -59.02810 | 2.00000 | 40.00 | 1.69895 | 30.13 | L61 | G6 -76.55 |
| 18 | 632.12100 | 35.96296 | 40.00 | | | | |
| 19 | Flat | 1.80000 | 58.00 | 1.51633 | 64.14 | COVER | |
| 20 | Flat | 0.02548 | 58.00 | | | | |
| 21 | Flat | 0.05245 | | | | | |

Fig. 11

| OBJECT DISTANCE | INFINITY | 2.0m | 0.43m |
|---|---|---|---|
| THI 2 | 11.32281 | 10.03557 | 0.80457 |
| THI 7 | 4.03469 | 5.32194 | 14.55294 |
| THI 11 | 33.23319 | 29.03310 | 3.91760 |
| THI 13 | 0.80435 | 5.00445 | 30.11995 |
| FOCAL LENGTH (mm) | 120.0000 | 113.2340 | 81.0481 |
| F NUMBER | 3.5000 | 3.2548 | 2.0779 |
| MAGNIFICATION | 0.0000 | 0.0653 | 0.5000 |
| OBJECT DISTANCE (mm) | INFINITY | 2000.0000 | 433.3460 |
| ANGLE OF VIEW | 13.1° | 12.7° | 8.98° |

| No. | Rdy | Thi (mm) | H*2 (mm) | nd | vd | LENS | FOCAL LENGTH (mm) |
|---|---|---|---|---|---|---|---|
| 0 | Flat | INFINITY | | | | | |
| 1 | 81.15000 | 4.20000 | 40.00 | 1.91650 | 31.60 | L11 | G1 125.43 |
| 2 | 264.37000 | 14.45452 | 39.30 | | | | |
| 3 | 54.79000 | 3.70000 | 32.90 | 1.63854 | 55.38 | L21 | |
| 4 | 101.05800 | 1.00000 | 31.40 | 1.68893 | 31.07 | L22 | G2 136.26 |
| 5 | 28.75000 | 1.36000 | 29.20 | | | | |
| 6 | 31.27200 | 5.90000 | 29.00 | 1.58913 | 61.13 | L23 | |
| 7 | 5422.42300 | 3.69078 | 28.00 | | | | |
| 8 | -120.67000 | 3.67000 | 25.40 | 1.91650 | 31.60 | L31 | G3 -65.23 |
| 9 | -40.16800 | 1.00000 | 24.90 | 1.72047 | 34.71 | L32 | |
| 10 | 58.13900 | 8.22000 | 23.70 | | | | |
| 11 | Flat | 38.76431 | 22.43 | | | St | |
| 12 | -228.03700 | 4.70000 | 31.80 | 1.58913 | 61.13 | L41 | G4 102.49 |
| 13 | -48.25500 | 1.69042 | 33.00 | | | | |
| 14 | 41.48400 | 3.90000 | 36.10 | 1.62041 | 60.29 | L51 | G5 1144.01 |
| 15 | 61.83500 | 3.50000 | 35.80 | 1.80518 | 25.42 | L52 | |
| 16 | 44.16200 | 8.14000 | 34.90 | | | | |
| 17 | -37.63800 | 1.00000 | 35.00 | 1.57501 | 41.50 | L61 | G6 -388.57 |
| 18 | 79.90500 | 6.70000 | 39.60 | 1.91650 | 31.60 | L62 | |
| 19 | -114.79100 | 36.50996 | 40.00 | | | | |
| 20 | Flat | 1.80000 | 58.00 | 1.51633 | 64.14 | COVER | |
| 21 | Flat | 0.10000 | 58.00 | | | | |

Fig. 15

| OBJECT DISTANCE | INFINITY | 2.0m | 0.43m |
|---|---|---|---|
| THI 2 | 14.45452 | 12.80555 | 0.80000 |
| THI 7 | 3.69078 | 5.68601 | 17.60802 |
| THI 11 | 38.76431 | 34.30465 | 7.75555 |
| THI 13 | 1.69042 | 5.80383 | 32.43647 |
| FOCAL LENGTH (mm) | 120.0000 | 116.0919 | 90.4306 |
| F NUMBER | 3.5000 | 3.2874 | 2.2633 |
| MAGNIFICATION | 0.0000 | 0.0654 | 0.5000 |
| OBJECT DISTANCE (mm) | INFINITY | 2000.0000 | 428.6139 |
| ANGLE OF VIEW | 13.2° | 12.7° | 8.83° |

OPTICAL SYSTEM FOR IMAGE PICKUP, AND IMAGE PICKUP DEVICE

TECHNICAL FIELD

The present invention relates to an optical system for image pickup that can be favorably used in an image pickup apparatus, such as a camera.

BACKGROUND ART

Japanese Patent Publication No. 2013-104994 (hereinafter referred to as "Document 1") discloses the provision of an inner focus-type, large-aperture telephoto macro lens which, while suppressing increases in external diameter of the product, has an anti-shake function capable of obtaining favorable optical characteristics. The macro lens disclosed in Document 1 is an inner focus-type, large-aperture telephoto macro lens with an anti-shake function, and includes, in order from the object side to the image plane side: a first lens group with positive refractive power; a second lens group with negative refractive power; a third lens group with positive refractive power; a fourth lens group with positive refractive power; a fifth lens group with negative refractive power; and a sixth lens group with positive refractive power. The macro lens is configured so that the image can be moved by moving the fifth lens group in a direction substantially perpendicular to the optical axis.

SUMMARY OF INVENTION

In a telephoto macro lens, the number of lenses constructing the system is large. As one example, the macro lens in Document 1 has a nineteen-lens configuration, has a long overall length, is heavy, and is susceptible to camera shake. Even if this lens is made compatible with autofocus (AF), any increase in the number of lenses that are moved to adjust the focus will increase the load on the AF system, causing a drop in the focusing speed. As a particular issue, in recent years, image pickup apparatuses such as cameras have started using large image pickup elements (sensors, imaging elements, imaging devices). Lens systems (optical systems) for image pickup using such large image pickup elements should have the large image circle and tend to become large in lens diameter and large in overall size. For this reason, there is demand for the realization of an optical system that is a telephoto-type macro lens, has a large image circle, has a simple configuration, and becomes compact.

One aspect of the present invention is an optical system for image pickup consisting of a first refractive optical system disposed on an object side with respect to an aperture stop and a second refractive optical system disposed on an image plane side with respect to the aperture stop. The first refractive optical system includes a first lens group with positive refractive power, a second lens group with positive refractive power, and a third lens group with negative refractive power. The second refractive optical system includes a fourth lens group with positive refractive power, a fifth lens group with positive refractive power, and a sixth lens group with negative refractive power. When focusing from infinity to a short distance (close range), the first lens group, the third lens group, and the sixth lens group do not move with respect to the aperture stop and the second lens group and the fourth lens group move toward the object side.

This optical system is composed of telephoto-type (reversed retrofocus type) optical systems that each have a positive-positive-negative arrangement of refractive powers and are coupled on the object side and the image plane side with the aperture stop in between. The telephoto type optical systems respectively include the positive lens groups that move during focus adjustment. By moving these positive lens groups in the same direction during focus adjustment, it is possible to mainly perform the focus adjustments using one of the positive lens groups and to efficiently correct various aberrations caused by the movement (travel) of that positive lens group with the other positive lens group. This means that focus adjustment is performed with a small number of lenses and it is possible to provide an optical system that is capable of favorably correcting aberrations from infinity to a short distance (close range) using a lens configuration with a low number of lenses. In addition, since the sixth lens group that is closest to the image plane side has negative refractive power, it is possible, by disposing a negative lens on the image plane side, to widen the light beam toward the image pickup plane and realize an optical system with a large image circle.

One example of this optical system is an optical system with a six-group and ten or eleven-lens configuration where the first lens group is composed of a single lens with positive refractive power, the second lens group is composed, in order from the object side, of one cemented lens and a single lens with positive refractive power, the third lens group is composed of one cemented lens, the fourth lens group is composed of a single lens with positive refractive power, the fifth lens group is composed of a single cemented lens, and the sixth lens group is composed of a single cemented lens or a single lens with negative refractive power.

Another aspect of the present invention is an image pickup apparatus (image capture device, imaging apparatus) including: the optical system described above; and an image pickup element disposed on the image plane side of the optical system. The optical system may be an interchangeable lens and the image pickup apparatus may include digital cameras, video cameras, TV cameras, and action cameras. Since it is possible to provide a compact optical system with a large aperture, the image pickup apparatus can be miniaturized.

BRIEF DESCRIPTION OF DRAWINGS

FIG. 2 depicts lens data of the optical system shown in FIG. 1.

FIG. 3 depicts various numerical values of the optical system shown in FIG. 1 at each object distance.

FIG. 6 depicts lens data of the optical system shown in FIG. 5.

FIG. 7 depicts various numerical values of the optical system shown in FIG. 5 at each object distance.

FIG. 10 depicts lens data of the optical system shown in FIG. 9.

FIG. 11 depicts various numerical values of the optical system shown in FIG. 9 at each object distance.

FIG. 14 depicts lens data of the optical system shown in FIG. 13.

FIG. 15 depicts various numerical values at each object distance for the optical system shown in FIG. 13.

DESCRIPTION OF EMBODIMENTS

Figure 1:
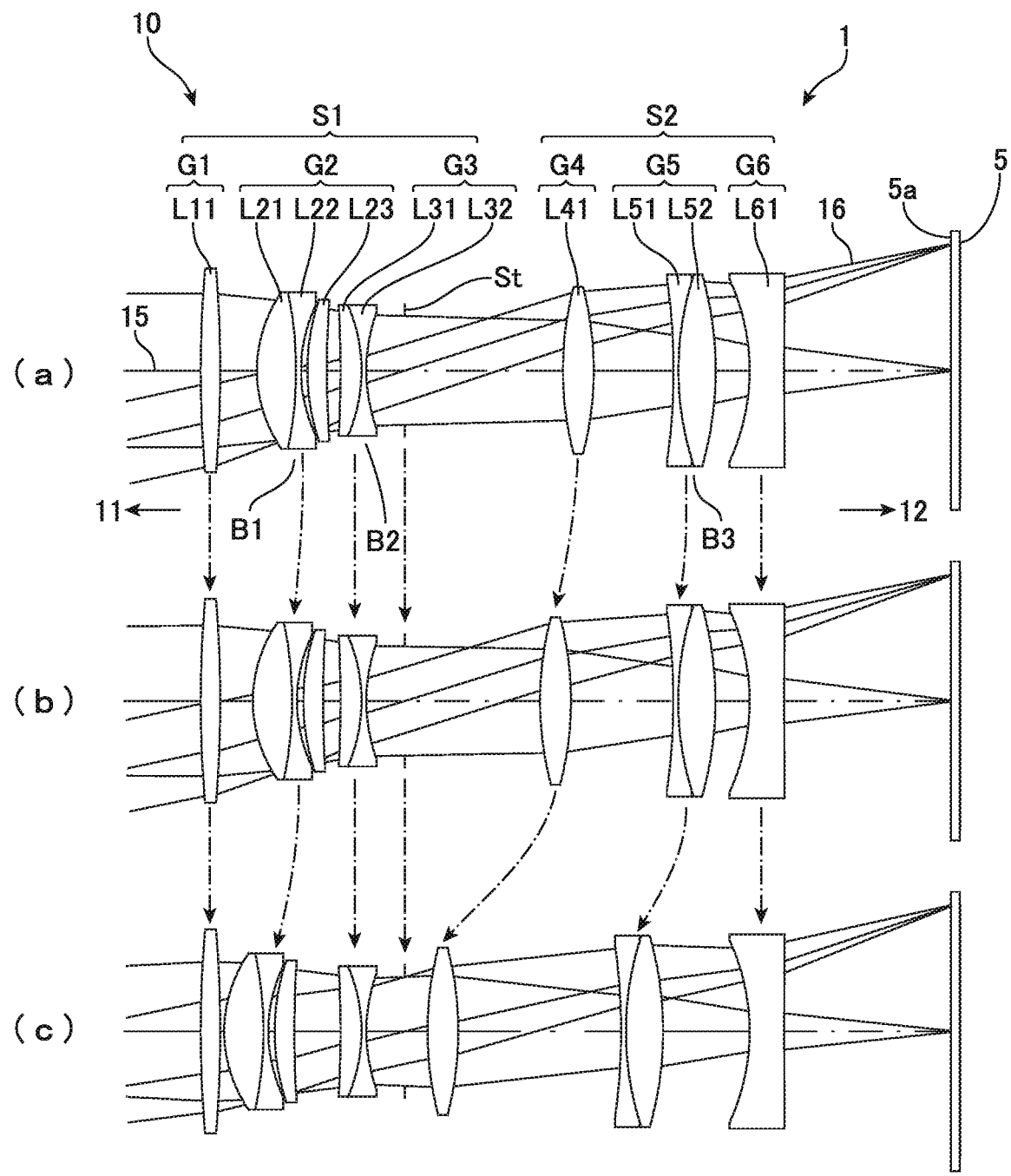
FIG. 1 depicts arrangements of an image pickup apparatus including an optical system for image pickup at each object distance.

FIG. 1 depicts one example of an image pickup apparatus equipped with an optical system according to the present invention. The image pickup apparatus (image capture apparatus, imaging apparatus, camera or camera device) 1 includes an optical system (image pickup optical system, image capturing optical system, image forming optical system, imaging optical system, lens system) 10 and an image pickup element (image pickup device, imaging device) 5 disposed on an image plane side (image side, image pickup side, image forming side) 12 of the optical system 10. The optical system 10 is an optical system for image pickup (optical system for capturing image, optical system for imaging) and is composed of a first refractive optical system S1 disposed on an object side (subject side) 11 with respect to an aperture stop (or simply "stop") St and a second refractive optical system S2 disposed on the image plane side with respect to the aperture stop St. The first refractive optical system S1 includes, in order from the object 11 side, a first lens group G1 with positive refractive power, a second lens group G2 with positive refractive power, and a third lens group G3 with negative refractive power. The second refractive optical system S2 includes, in order from the object 11 side, a fourth lens group G4 with positive refractive power, a fifth lens group G5 with positive refractive power, and a sixth lens group G6 with negative refractive power.

The optical system 10 is a macro lens that is telephoto, with a focal length of around 120 mm for example. The optical system 10 has an inner focus configuration so that when focusing from infinity to a short distance (close range), the first lens group G1, the third lens group G3, and the sixth lens group G6 do not move with respect to the aperture stop St, but the second lens group G2 and the fourth lens group G4 move toward the object side 11.

In this optical system 10, the first refractive optical system S1 has a positive-positive-negative arrangement of refractive powers due to the lens groups G1, G2 and G3, and the second refractive optical system S2 has a positive-positive-negative arrangement of refractive powers due to the lens groups G4, G5 and G6. This means that the optical system 10 is an optical system where telephoto-type ("reversed retrofocus" type) optical systems S1 and S2 that each have a positive-positive-negative arrangement of refractive powers are coupled on the object side 11 and the image plane side 12 with the aperture stop St in between. In addition, the positive lens groups G2 and G4 that move during focus adjustment are disposed in the telephoto-type optical systems S1 and S2. During focus adjustment, these positive lens groups G2 and G4 move in the same direction, that is, toward the object side 11 when focusing from infinity to a short distance. By using this configuration, it is possible to mainly perform focus adjustments using one of the positive lens groups and to efficiently correct various aberrations caused by the movement of that positive lens group with the other positive lens group.

By this configuration, focus adjustment can be performed with a small number of lenses. As one example, in the optical system 10 according to the present embodiment, the lens group G2 has a three-lens configuration and the lens group G4 has a single-lens configuration. In addition, it is possible to provide the optical system 10 that is compact with an overall length of around 120 mm, is lightweight, and is capable of favorably correcting aberrations from infinity to a short distance with a low number of lenses, in the present embodiment as one example, with an overall configuration of 10 lenses in spite of being a telephoto-type macro lens.

Accordingly, it is possible to provide a telephoto macro lens that is lightweight and is not susceptible to camera shake. In addition, since it is possible to suppress the number of lenses that move when varying the focal length, it is possible, for an autofocus-type macro lens, to provide a macro lens that can reduce the load on the autofocus mechanism and thereby has a highly sensitive and highly precise autofocus function. In the optical system 10, the first lens group G1 and the sixth lens group G6 do not move during adjustments of focal length, so that the overall length AL of the optical system 10 is fixed. This means that it is possible to provide an optical system 10 where it is easy to adjust the object distance (shooting distance) without changing the overall lens length AL during macro shooting (macro photographing).

In addition, by disposing a negative lens L61 as the final sixth lens group G6 on the image plane side 12, it is possible to widen the light beam 16 that reaches the image pickup plane 5a and provide the optical system 10 with a large image circle. For the optical system 10 according to the present embodiment, the diameter of the image circle is 56 mm.

Typically in the optical system 10, focus adjustment is mainly performed by the lens group G4 with positive refractive power in the second refractive optical system S2, and the various aberrations caused by the movement of the lens group G4 can be corrected by the lens group G2 with positive refractive power in the first refractive optical system S1. In this optical system 10, the second lens group G2 includes a first cemented lens B, and the amount of movement (travel distance) PF1 of the second lens group G2 during focusing and the amount of movement (travel distance) PB1 of the fourth lens group G4 during focusing satisfy Condition (1) below. Note that in this specification, the movement directions (amount of movement, movement distances, travel distance) of the lens groups are expressed with the object side 11 as positive, and when focusing so that the object distance moves from infinity to a short distance, the second lens group G2 and the fourth lens group G4 move in the positive direction, that is, from the image plane side 12 toward the object side 11.

$$1 < PB1/PF1 < 8 \qquad (1)$$

The second lens group G2 moves mainly to correct chromatic aberration. If the lower limit of Condition (1) is exceeded, correction of aberration such as curvature of field becomes excessive and the movement distance of the second lens group G2 is too large, which makes it difficult to make the optical system 10 compact. If the upper limit of Condition (1) is exceeded, the amount of movement PF1 of the second lens group G2 is too small relative to the amount of movement PB1 of the fourth lens group G4 that moves during focus adjustment, making it difficult to correct aberrations. The lower limit of Condition (1) may be 2 and the upper limit may be 5.

The amount of movement PF1 of the second lens group G2 and the total length AL of the optical system 10 may satisfy Condition (2) below.

$$0.05 < PF1/AL < 0.15 \quad (2)$$

If the lower limit of Condition (2) is exceeded, the amount of movement PF1 of the second lens group G2 will be too small to fully compensate for variations in chromatic aberration due to changes in the focal length. If the upper limit is exceeded, correction of aberrations, such as curvature of field, will be excessive, and it becomes difficult to realize a compact optical system 10. The upper limit of Condition (2) may be 0.12, or may be 0.10.

The first cemented lens B1 included in the second lens group G2 that mainly corrects variations in chromatic aberration with respect to variations in focal length is a balsam lens, and includes a lens L21 with positive refractive power and a lens L22 with negative refractive power. The refractive index nd21 and the Abbe number vd21 of the lens L21 and the refractive index nd22 and the Abbe number vd22 of the lens L22 may satisfy Condition (3) below.

$$1.45 < nd21 < 1.65$$

$$1.65 < nd22 < 1.85$$

$$65 < vd21 < 85$$

$$20 < vd22 < 40 \quad (3)$$

By disposing the balsam lens B1, which satisfies Condition (3) and is capable of effectively correcting chromatic aberration, in the second lens group G2 that moves when the focal length moves, it is possible to effectively correct variations in chromatic aberration relative to variations in the focal length.

In addition, the surface on the image plane side 12 of the first cemented lens B1 is a surface that is concave on the image plane side 12, and the second lens group G2 may be constructed of the first cemented lens B1, and a lens L23 that is adjacent to the image plane side surface of the first cemented lens B1 with a minimum air gap in between and whose object side 11 surface is convex toward the object side 11. By using a combination of the cemented lens B1 that is concave on the image plane side 12 and the lens L23 that is convex toward the object side 11 in the second lens group G2, it is possible to dispose many surfaces that are effective in correcting aberration in a narrow space. This means that the lens group G2 that moves during focus adjustment can have a compact configuration and high aberration correction performance.

The amount of movement PB1 of the fourth lens group G4 that moves mainly to adjust the focal length (i.e., for focusing) and the overall length AL of the optical system 10 may satisfy Condition (4) below.

$$0.15 < PB1/AL < 0.40 \quad (4)$$

If the lower limit of Condition (4) is exceeded, the amount of movement (travel distance) PB1 of the fourth lens group G4 becomes too small, which makes the adjustment range of the focal length too narrow. On the other hand, when the upper limit of Condition (4) is exceeded, it becomes difficult to provide a compact optical system 10. The lower limit of Condition (4) may be 0.20, and the upper limit may be 0.35.

Typically, the fourth lens group G4 may be configured as a single lens L41 that has positive refractive power. By constructing the fourth lens group G4, which moves for adjustment of focal length, of a single lens L41 as the minimum configuration, it is possible to reduce the number of lenses that compose the optical system 10 and to reduce the load on an autofocus mechanism, which makes it possible to provide an optical system 10 with high focus adjustment performance (sensitivity and precision).

The refractive index nd41 and the Abbe number vd41 of the lens L41 that constructs the fourth lens group G4 may satisfy Condition (5) below.

$$1.40 < nd41 < 1.60$$

$$70 < vd41 < 90 \quad (5)$$

By placing an ED lens (that is a special low dispersion lens or anomalous dispersion lens) in the fourth lens group G4 that moves to change the focal length, variations in chromatic aberration due to variations in focal length are also effectively corrected by the fourth lens group G4.

In addition, in this optical system 10, a cemented lens B3 may be disposed in the fifth lens group G5 and configured to move during focusing. By additionally moving the positive fifth lens group G5 included in the second refractive optical system S2 during adjustment of focal length, it is possible to have the fifth lens group G5 contribute to the correction of chromatic aberration during macro magnification and possible to suppress an increase in the amount of movement PF1 of the second lens group G2, thereby making it possible to provide a much more compact optical system 10. Like the other positive lens groups G2 and G4, the fifth lens group G5 may simply move from the image plane side 12 toward the object side 11 during focusing from infinity to a short distance (at macro magnification), may move in the reverse direction (minus direction, from the object side 11 toward the image plane side 12), or the movement direction may change midway depending on the object distance.

Typically, in the optical system 10, the third lens group G3 may be composed of a single cemented lens B2 and the fifth lens group G5 may be composed of a single cemented lens B3. The first lens group G1 may be composed of a single lens that has positive refractive power, and the sixth lens group G6 may be composed of a single cemented lens or a single lens with negative refractive power. Accordingly, in the optical system 10, the first lens group G1 may be composed of one lens, the second lens group G2 may be composed of three lenses, the third lens group G3 may be composed of two lenses, the fourth lens group G4 may be composed of one lens, the fifth lens group G5 may be composed of two lenses, and the sixth lens group G6 may be composed of one or two lenses, so that the number of lenses in the optical system 10 as a whole may be as low as ten or eleven.

Example 1

The optical system 10 depicted in FIG. 1 includes a first refractive optical system S1 disposed on the object side 11 with respect to the aperture stop (stop) St and a second refractive optical system S2 disposed on the image plane side 12 with respect to the aperture stop St. The first refractive optical system S1 is composed, along the optical axis 15 and in order from the object side 11, of the first lens group G1 that has positive refractive power, a second lens group G2 that has positive refractive power, and a third lens group G3 that has negative refractive power. The first lens group G1 has a single-lens configuration composed of a biconvex positive lens L11, and the second lens group G2 has a three-lens configuration composed of a balsam lens (cemented lens), which is made up of a biconvex positive lens L21 and a biconcave negative lens L22, and a positive meniscus lens L23 that is convex toward the object side 11. The object side 11 surface of the meniscus lens L23 is adjacent to the concave surface on the image plane side 12 of the cemented lens B1 with a minimum air gap in between. The third lens group G3 has a two-lens configuration composed of a balsam lens (cemented lens) B2, which is made up of a positive meniscus lens L31 that is convex toward the image plane side 12 and a negative biconcave lens L32.

The second refractive optical system S2 is composed, along the optical axis 15 and in order from the object side 11, of the fourth lens group G4 that has positive refractive power, the fifth lens group G5 that has positive refractive power, and the sixth lens group G6 that has negative refractive power. The fourth lens group G4 has a single-lens configuration composed of a biconvex positive lens L41, and the fifth lens group G5 has a two-lens configuration composed of a balsam lens (cemented lens), which is made up of a biconcave negative lens L51 and a biconvex positive lens L52. The sixth lens group G6 has a single-lens configuration composed of a biconcave negative lens L61 where the radius of curvature of the object side 11 surface is smaller than the radius of curvature of the image plane side 12 surface.

FIG. 1(a) depicts the arrangement of lenses when the object distance (shooting distance) is infinite, FIG. 1(b) depicts the arrangement of lenses when the object distance from the image plane 5a is 2.0 m, and FIG. 1(c) depicts the arrangement of lenses when the object distance is the minimum (that is, a short distance, the closest distance, in more detail when the image pickup distance is 0.43 m from the image plane 5a). The arrangements of lenses depicted for the following specific examples are also the same.

FIG. 2 depicts data on each lens that constructs the optical system 10. The radius of curvature (Rdy) is the radius of curvature (mm) of each surface of each lens arranged in order from the object side 11, the distance (interval, gap) Thi is the distance (mm) between the lens surfaces, the effective diameter H*2 is the effective diameter (diameter, mm) of each lens surface, the refractive index nd is the refractive index (d line) of each lens, and the Abbe number vd is the Abbe number (d line) of each lens. The lens names and the focal length (combined focal length mm) of each group are also depicted. Note that although every lens that constructs the optical system 10 is a spherical lens in this example, the lenses may include an aspherical lens. The distance Thi for each surface is indicated for when the object distance is infinite.

In the optical system 10, the second lens group G2, the fourth lens group G4, and the fifth lens group G5 move to adjust the focal length according to the object distance, and the other lens groups G1, G3, and G6 and the aperture St do not move. FIG. 3 depicts the values of the distances Thi2, Thi7, Thi11, Thi13, and Thi16, the combined focal length (mm) of the optical system 10, the f number, the magnification, the object distance (mm), and the angle of view that change when the object distance is infinite, 2.0 m, and 0.43 m (shortest distance, closest range). The same applies to the lens data given later in this specification.

FIGS. 4(a), (b), and (c) depict the spherical aberration, astigmatism, and distortion of the optical system 10 at infinite, intermediate (2.0 m) and the closest (0.43 m) object distances. Spherical aberration is depicted for a wavelength of 435.8340 nm (dot-dot-dash line), a wavelength of 486.1330 nm (long dash line), a wavelength of 546.0740 nm (solid line), a wavelength of 587.5620 nm (dot-dash line), and a wavelength of 656.2730 nm (short dash line). Astigmatism is depicted for tangential rays T and sagittal rays S. The same applies to the aberration diagrams given later.

Numerical values indicating the main performance of the optical system 10 are as follows.

Image circle: φ56 mm
Overall lens length (LA): 119.07 mm
Focal length (infinity): 120 mm
Magnification (closest distance): 0.5
Amount of Movement (PF1) of second lens group G2: 6.67 mm
Amount of Movement (PB1) of fourth lens group G4: 27.64 mm
Condition (1) (PB1/PF1): 4.14
Condition (2) (PF1/AL): 0.056
Condition (4) (PB1/AL): 0.232

Figure 4:
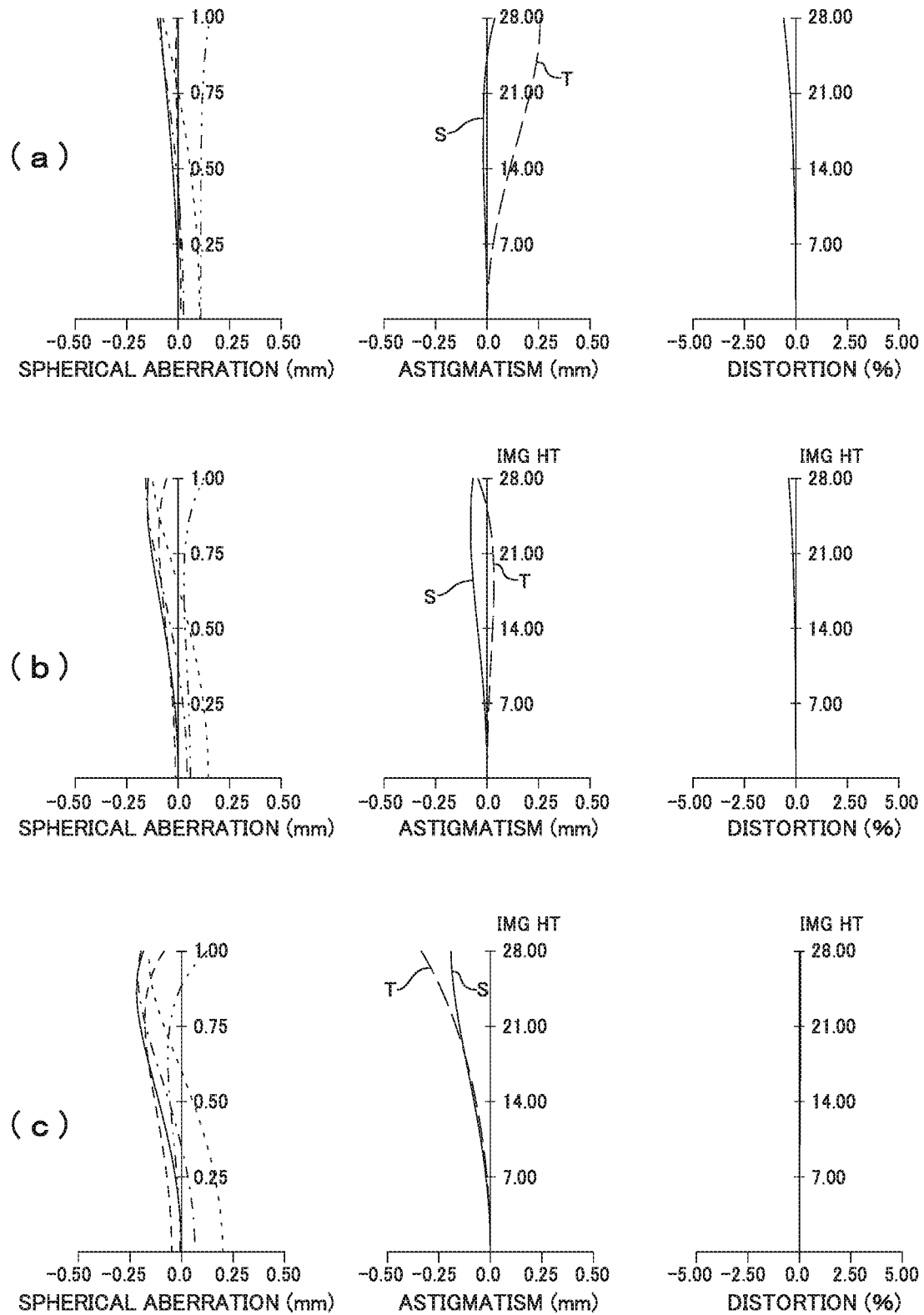
FIG. 4 depicts various aberrations of the optical system shown in FIG. 1 at each object distance.

This image pickup optical system 10 has a focal length of 120 mm and a magnification of 0.5 at the shortest (closest) distance (range), and therefore performs as a telephoto-type macro lens. This optical system 10 is a telephoto type with a positive-positive-negative arrangement of refractive powers before and after the stop St, and is an inner focus type where the total length LA is constant and the second lens group G2, the fourth lens group G4, and the fifth lens group G5, which are disposed inside the optical system and have positive refractive power, move to adjust the focal length. In addition, Conditions (1), (2) and (4) given earlier are satisfied. The cemented lens B1 of the second lens group G2 satisfies Condition (3) and the lens L41 of the fourth lens group G4 satisfies Condition (5). Therefore, it is possible to provide an optical system 10 which, while having a simple configuration with a total of 10 lenses, performs as a telephoto-type macro lens and, as depicted in FIG. 4, favorably corrects various aberrations at each object distance.

In addition, the optical system 10 has a large image circle of 56 mm, and a compact overall size with a total length LA of 120 mm or shorter and a maximum lens diameter of 42 mm or less. This means that a lightweight telephoto macro lens can be provided by the optical system 10, which makes it easy to reduce camera shake. The fourth lens group G4 that moves greatly during macro photographing has a single-lens configuration, and the second lens group G2 that moves together with this has a three-lens configuration composed of the cemented lens B1 and a positive lens. The fifth lens group G5 that moves slightly in order to further improve the aberration performance is a single cemented lens B3, or in other words, has a two-lens configuration. Accordingly, it is possible to provide the optical system 10 where a small number of lenses move during macro shooting (macro photographing), where it is easy to adjust focus when focusing manually or when using AF, and where variations in object distance can be easily handled.

Example 2

Figure 5:
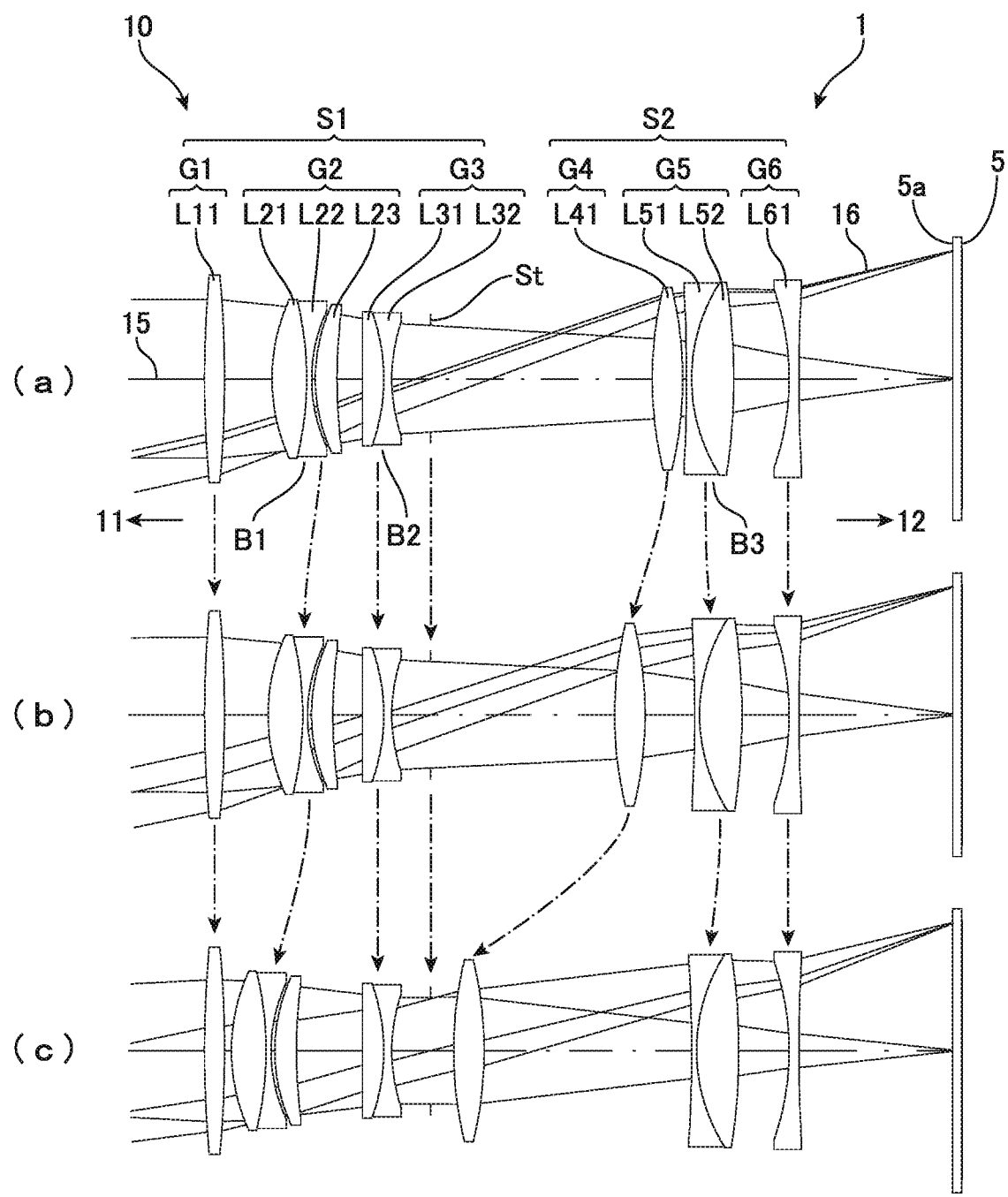
FIG. 5 depicts arrangements of an image pickup apparatus including another optical system for image pickup at each object distance.

FIG. 5 depicts an example of a camera 1 provided with a different image pickup optical system 10. This optical system 10 performs as a telephoto-type macro lens as well as the optical system (lens system) according to Example 1. The basic configuration of this optical system 10 is the same as the optical system of Example 1 depicted in FIG. 1, and is an optical system 10 that is an inner focus type where the total length LA is constant, where the lens groups G1 to G3 that have positive-positive-negative refractive powers are disposed on the object side 11 and the lens groups G4 to G6 that have positive-positive-negative refractive powers are disposed on the image plane side 12 with the aperture stop (stop) St in between, and where the lens groups G2, G4, and G5, which are disposed inside the optical system and have positive refractive power, move to adjust the focal length. This optical system 10 also realizes a compact and lightweight telephoto macro lens with a simple configuration composed of a total of 10 lenses.

When the object distance moves from infinity to a short distance, the fifth lens group G5 in the optical system according to Example 1 simply moves toward the object side 11. In this optical system 10 however, the fifth lens group G5 first moves toward the image plane side 12 up to the intermediate distance (where the object distance is 2.0 m) and then moves toward the object side 11 until the shortest distance (where the object distance is 0.43 m, closest range). The amount of movement PB2 of the fifth lens group G5 when focusing from infinity to the shortest distance is −1.01 mm, and moves on the direction from the object side 11 toward the image plane side 12 that is the opposite direction to the movement of the second lens group G2 and the fourth lens group G4. By moving the fifth lens group G5, which has positive refractive power, in the opposite direction, it is possible to correct chromatic aberration and the like even more favorably, and it is possible to achieve a sufficient movement distance for the fourth lens group G4, which moves toward the object side 11, to adjust the focal length. The amount of movement PB2 of the fifth lens group G5 may satisfy Condition (6) below. Here, as described earlier, it is assumed that an amount of movement (direction) from the image plane side 12 toward the object side 11 is set as positive.

$$PB2<0 \quad (6)$$

Figure 8:
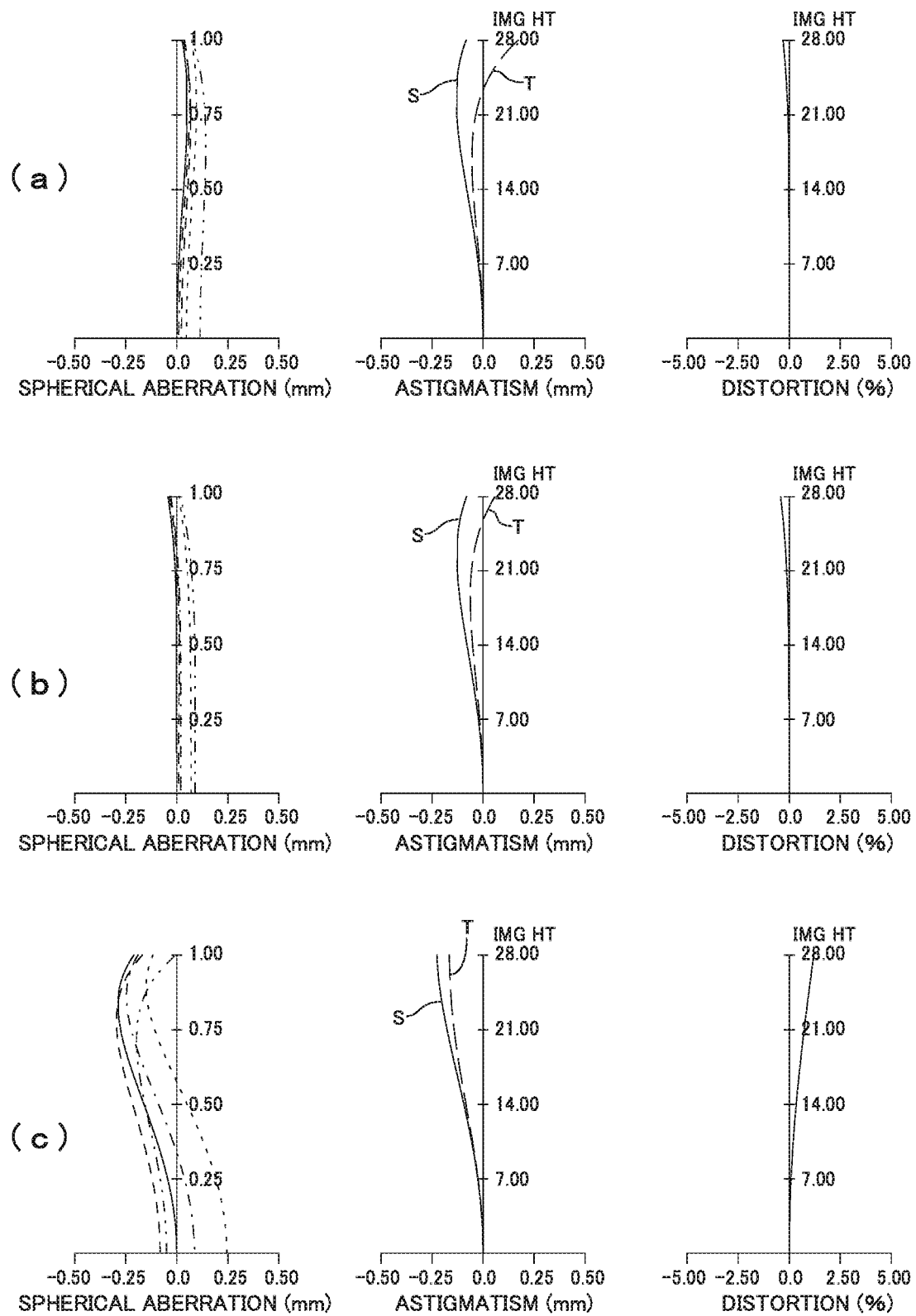
FIG. 8 depicts various aberrations for the optical system shown in FIG. 5 at each object distance.

FIG. 6 depicts data on each lens that constructs the optical system 10. FIG. 7 shows the values of the distances Thi2, Thi7, Thi11, Thi13, Thi16 and various values of the optical system 10 when the object distance is infinite, an intermediate (2.0 m), and the closest (shortest) (0.43 m). FIGS. 8(*a*), (*b*), and (*c*) depict the spherical aberration, astigmatism, and distortion of the optical system 10 at the infinite, intermediate (2.0 m), and the closest (0.43 m) object distances.

Numerical values indicating the main performance of the optical system 10 are as follows.
    Image circle: φ56 mm
    Overall lens length (LA): 120.84 mm
    Focal length (infinity): 120 mm
    Magnification (closest): 0.5
    Amount of Movement (PF1) of second lens group G2: 8.24 mm
    Amount of Movement (PB1) of fourth lens group G4: 40.39 mm
        Condition (1) (PB1/PF1): 4.90
        Condition (2) (PF1/AL): 0.068
        Condition (4) (PB1/AL): 0.334

As described above, this optical system 10 has a magnification of 0.5 at the closest range and a focal length of 120 mm, and therefore performs as a telephoto-type macro lens. Conditions (1), (2), and (4) given earlier are satisfied. The cemented lens B1 of the second lens group G2 satisfies Condition (3), and the lens L41 of the fourth lens group G4 satisfies Condition (5). Therefore, it is possible to provide an optical system 10 which, while having a simple configuration with a total of 10 lenses, performs as a telephoto-type macro lens and, as depicted in FIG. 8, favorably corrects various aberrations at each object distance (shooting distance).

Example 3

Figure 9:
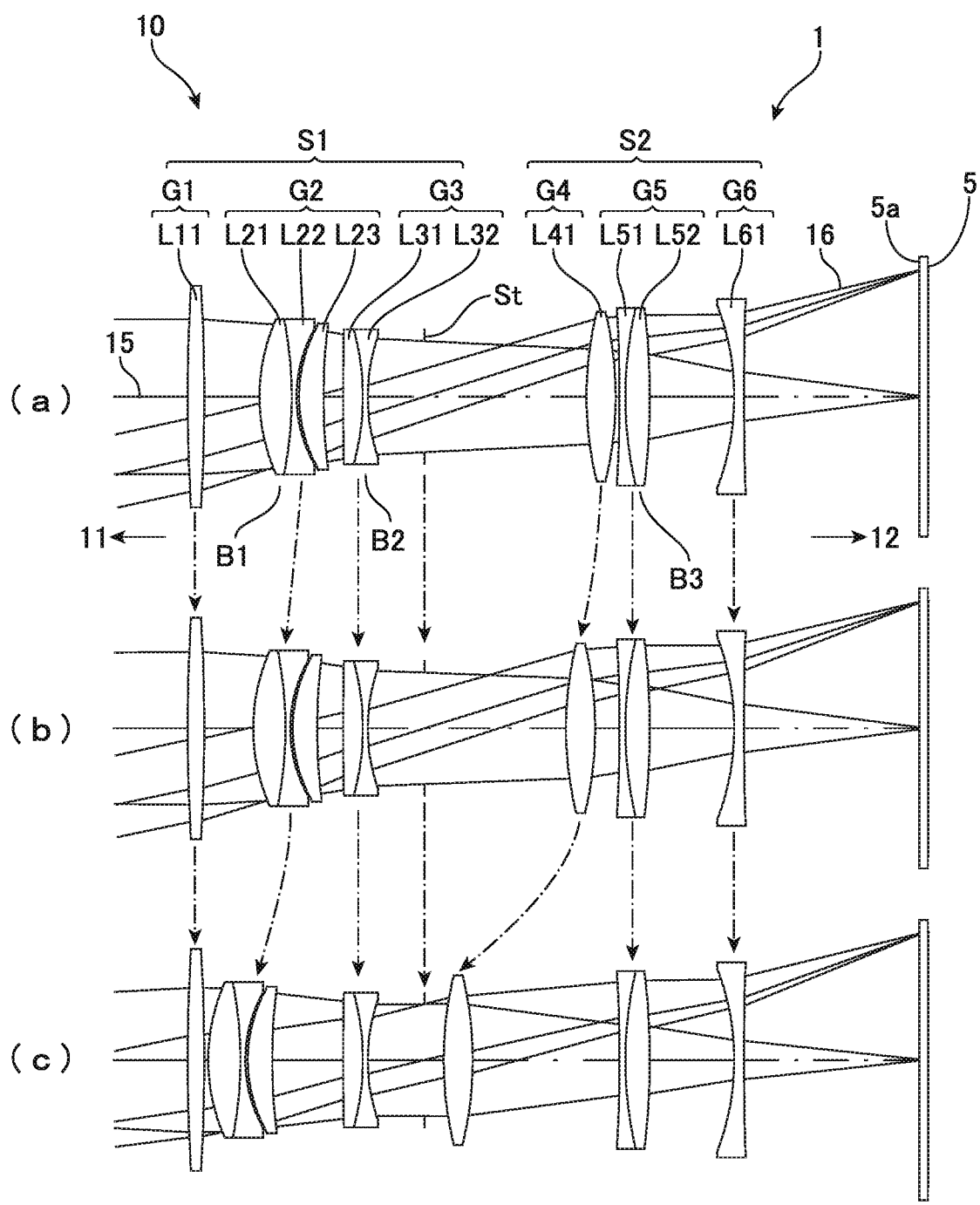
FIG. 9 depicts arrangements of an image pickup apparatus including yet another optical system for image pickup at each object distance.

FIG. 9 depicts an example of a camera 1 provided with yet another image pickup optical system 10. This optical system 10 performs as a telephoto-type macro lens as well as the optical system (lens system) according to Example 1. The basic configuration of this optical system 10 is the same as the optical system of Example 1 depicted in FIG. 1, and has the lens groups G1 to G3 that have positive-positive-negative refractive powers disposed on the object side 11 and the lens groups G4 to G6 that have positive-positive-negative refractive powers disposed on the image plane side 12 with the aperture stop (stop) St in between.

In this optical system 10, to adjust the focal length, the lens groups G2 and G4, which are disposed inside the optical system and have positive refractive power, move but the fifth lens group G5 does not move. Accordingly, in this optical system 10, together with the sixth lens group G6, the fifth lens group G5 constructs a non-moving lens group (fifth lens group) disposed closest to the image plane side 12. The combined focal length of this lens group is −130.39 mm, making it a lens group with negative refractive power. This means that this optical system 10 can be regarded as a five-group configuration with positive, positive, negative, positive, and negative refractive powers, and during focusing, the two lens groups G2 and G4 with positive refractive power, excluding the first lens group G1 that has positive refractive power and is disposed closest to the object side 11, move synchronously toward the object side 11.

Accordingly, this optical system 10 is an inner focus-type optical system 10 with a constant overall length LA, has a simple configuration with a total of 10 lenses, and is also capable of limiting the lens groups that move during focusing to two groups. This means that it is possible to provide an optical system 10 that is a compact and lightweight telephoto macro lens, facilitates adjustment of focus, and can further reduce the load on AF.

Figure 12:
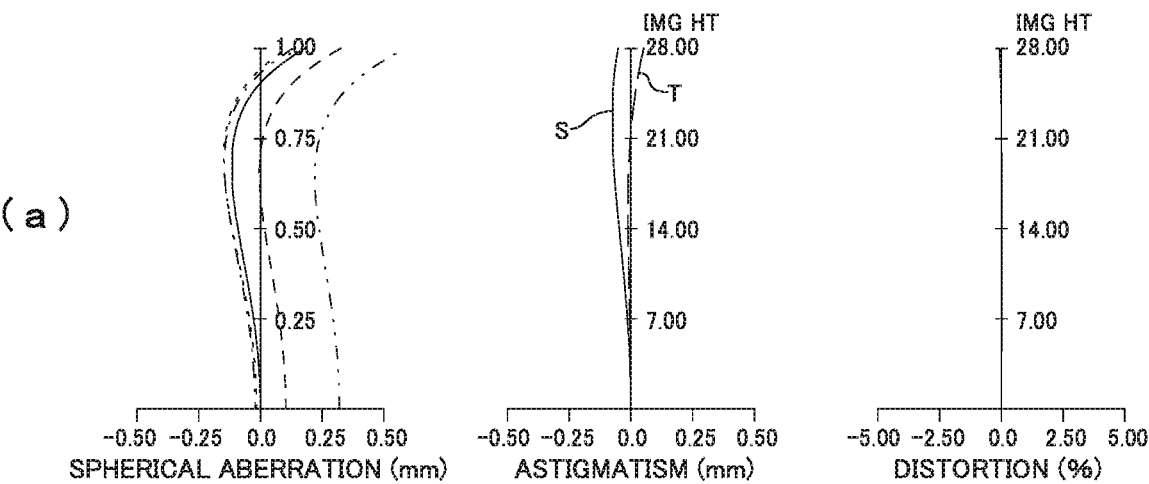
FIG. 12 depicts various aberrations of the optical system shown in FIG. 9 at each object distance.
Figure 12:
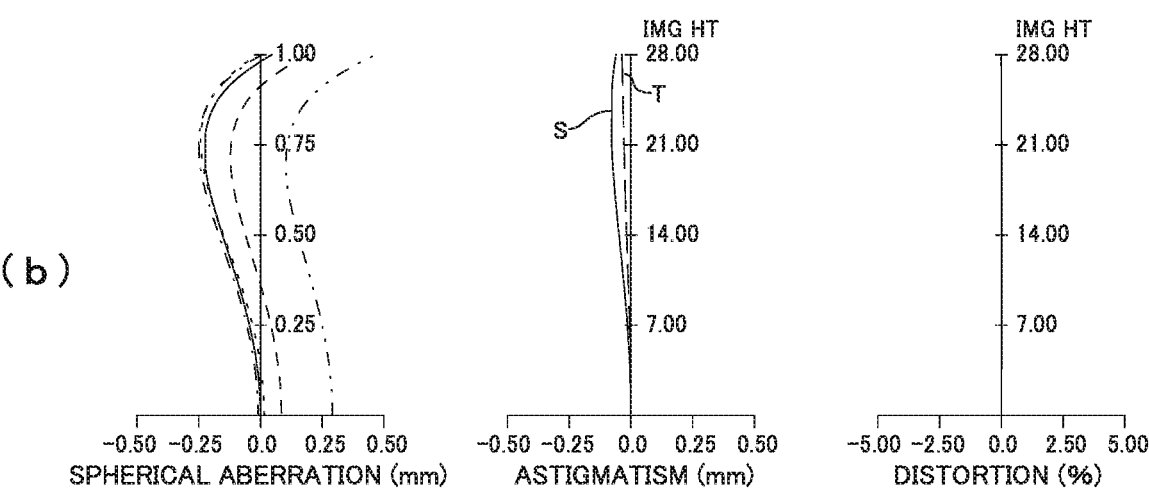
Figure 12:
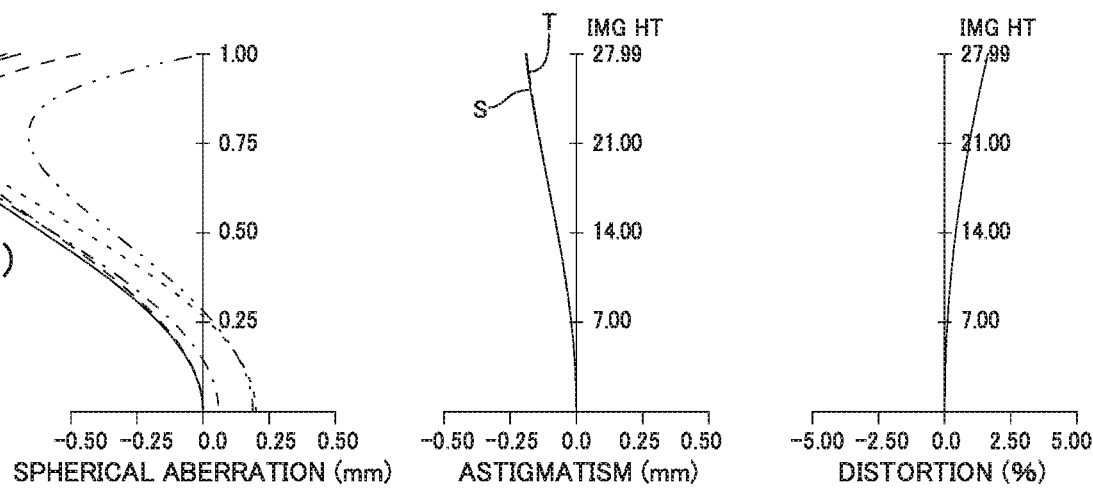

FIG. 10 depicts data on each lens that constructs this optical system 10. FIG. 11 depicts the values of the distances Thi2, Thi7, Thi11, and Thi13 and various values of the optical system 10 when the object distance is an infinite, an intermediate (2.0 m) and the closest (shortest) (0.43 m). FIGS. 12(*a*), 12(*b*), and 12(*c*) depict spherical aberration, astigmatism, and distortion of the optical system 10 at the infinite, intermediate (2.0 m), and the closest (0.43 m) object distances.

Numerical values indicating the main performance of the optical system 10 are as follows.
    Image circle: φ56 mm
    Overall lens length (LA): 114.14 mm
    Focal length (infinity): 120 mm
    Magnification (closest): 0.5
    Amount of Movement (PF1) of second lens group G2: 10.52 mm
    Amount of Movement (PB1) of fourth lens group G4: 29.32 mm
        Condition (1) (PB1/PF1): 2.79
        Condition (2) (PF1/AL): 0.092
        Condition (4) (PB1/AL): 0.257

As described above, this optical system 10 has a magnification of 0.5 at the closest range and a focal length of 120 mm, and therefore performs as a telephoto-type macro lens. Conditions (1), (2), and (4) given earlier are satisfied. The cemented lens B1 of the second lens group G2 satisfies Condition (3), and the lens L41 of the fourth lens group G4 satisfies Condition (5). Therefore, it is possible to provide an optical system 10 which, while having a simple configuration with a total of 10 lenses, performs as a telephoto-type macro lens and, as depicted in FIG. 12, favorably corrects various aberrations at each object distance.

Example 4

Figure 13:
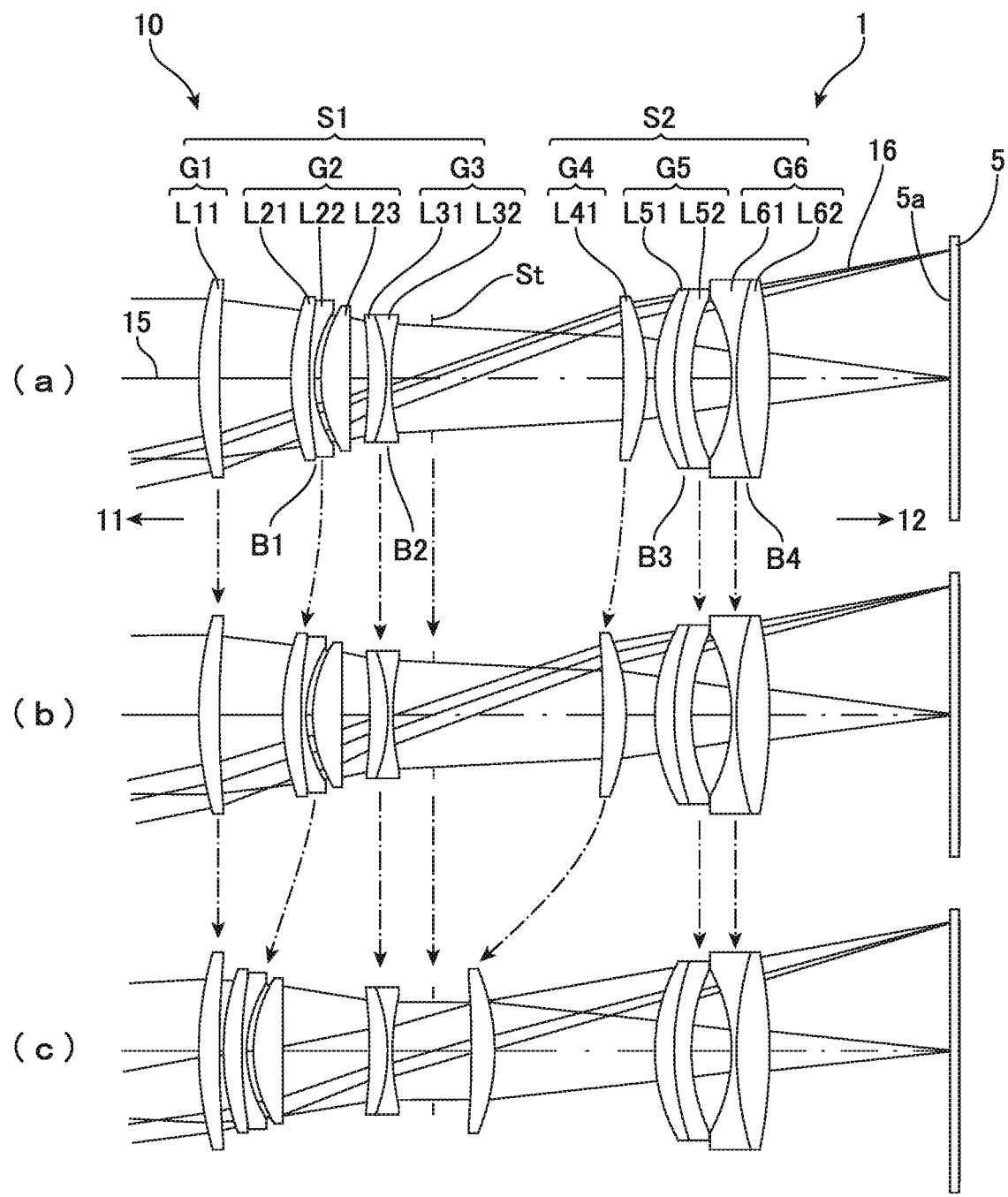
FIG. 13 depicts arrangement of an image pickup apparatus including yet another optical system for image pickup at each object distance.

FIG. 13 depicts an example of a camera 1 provided with yet another image pickup optical system 10. Like the optical system (lens system) according to Example 1, this optical system 10 performs as a telephoto-type macro lens. The basic configuration of the optical system 10 is the same as the optical system of Example 1 depicted in FIG. 1, and has the lens groups G1 to G3 that have positive-positive-negative refractive powers disposed on the object side 11 and the lens groups G4 to G6 that have positive-positive-negative refractive powers disposed on the image plane side 12 with the aperture stop (stop) St in between.

The first lens group G1 has a single-lens configuration composed of a positive meniscus lens L11 that is convex toward the object side 11 and the second lens group G2 has a three-lens configuration composed, in order from the object side 11, of a balsam lens (cemented lens) B1, which is made up of a positive meniscus lens L21 that is convex on the object side 11 and a negative meniscus lens L22 that is convex toward the object side 11, and a positive meniscus lens L23 that is convex toward the object side 11. The object side 11 surface of the meniscus lens L23 is adjacent to the concave surface on the image plane side 12 of the cemented lens B1 with a minimum air gap in between. The third lens group G3 has a two-lens configuration composed of a balsam lens (cemented lens) B2, which is made up, in order from the object side 11, of a positive meniscus lens L31 that is convex toward the image plane side 12 and a negative biconcave lens L32.

The fourth lens group G4 has a single-lens configuration composed of a positive meniscus lens L41 that is convex toward the image plane side 12, and the fifth lens group G5 has a two-lens configuration composed of a balsam lens (cemented lens) B3 made up, in order from the object side 11, of a positive meniscus lens L51 that is convex toward the object side 11 and a negative meniscus lens L52 that is convex toward the object side 11. The sixth lens group G6 has a two-lens configuration composed of a balsam lens (cemented lens) B4 made up, in order from the object side 11, of a negative biconcave lens L61 and a positive biconvex lens L62. Accordingly, the optical system 10 is composed of a total of eleven lenses disposed along the optical axis 15.

With this optical system 10, like the optical system of Example 3, to adjust the focal length, the lens groups G2 and G4, which are disposed inside the optical system and have positive refractive power, move but the fifth lens group G5 does not move. Accordingly, in this optical system 10, together with the sixth lens group G6, the fifth lens group G5 constructs a non-moving lens group (fifth lens group) disposed closest to the image plane side 12. The combined focal length of the non-moving lens group including the lenses L51, L52, L61, and L62 is −653.51 mm, making it a lens group with negative refractive power. This means that like the optical system of Example 3, this optical system 10 may also be regarded as a five-group configuration of positive, positive, negative, positive, and negative refractive powers, and during focusing, the two lens groups G2 and G4 with positive refractive power, excluding the first lens group G1 that has positive refractive power and is disposed closest to the object side 11, move synchronously toward the object side 11.

Accordingly, this optical system 10 is an inner focus-type optical system 10 with a constant overall length LA, has a simple configuration with a total of 11 lenses, and is also capable of limiting the lens groups that move during focusing to two. This means that it is possible to provide an optical system 10 that is a compact and lightweight telephoto macro lens, facilitates adjustments of focus, and can further reduce the load on AF.

FIG. 14 depicts data on each lens that constructs this optical system 10. FIG. 15 depicts the values of the distances Thi2, Thi7, Thi11, and Thi13 and various values of the optical system 10 when the object distance is an infinite, an intermediate (2.0 m) and the closest (shortest distance) (0.43 m). FIGS. 16(a), 16(b), and 16(c) depict spherical aberration, astigmatism, and distortion of the optical system 10 at the infinite, intermediate (2.0 m), and the closest (0.43 m) object distances.

Numerical values indicating the main performance of the optical system 10 are as follows.

Image circle: φ56 mm
Overall lens length (LA): 115.59 mm
Focal length (infinity): 120 mm
Magnification (closest): 0.5
Amount of Movement (PF1) of second lens group G2: 13.65 mm
Amount of Movement (PB1) of fourth lens group G4: 31.01 mm
Condition (1) (PB1/PF1): 2.41
Condition (2) (PF1/AL): 0.118
Condition (4) (PB1/AL): 0.268

Figure 16:
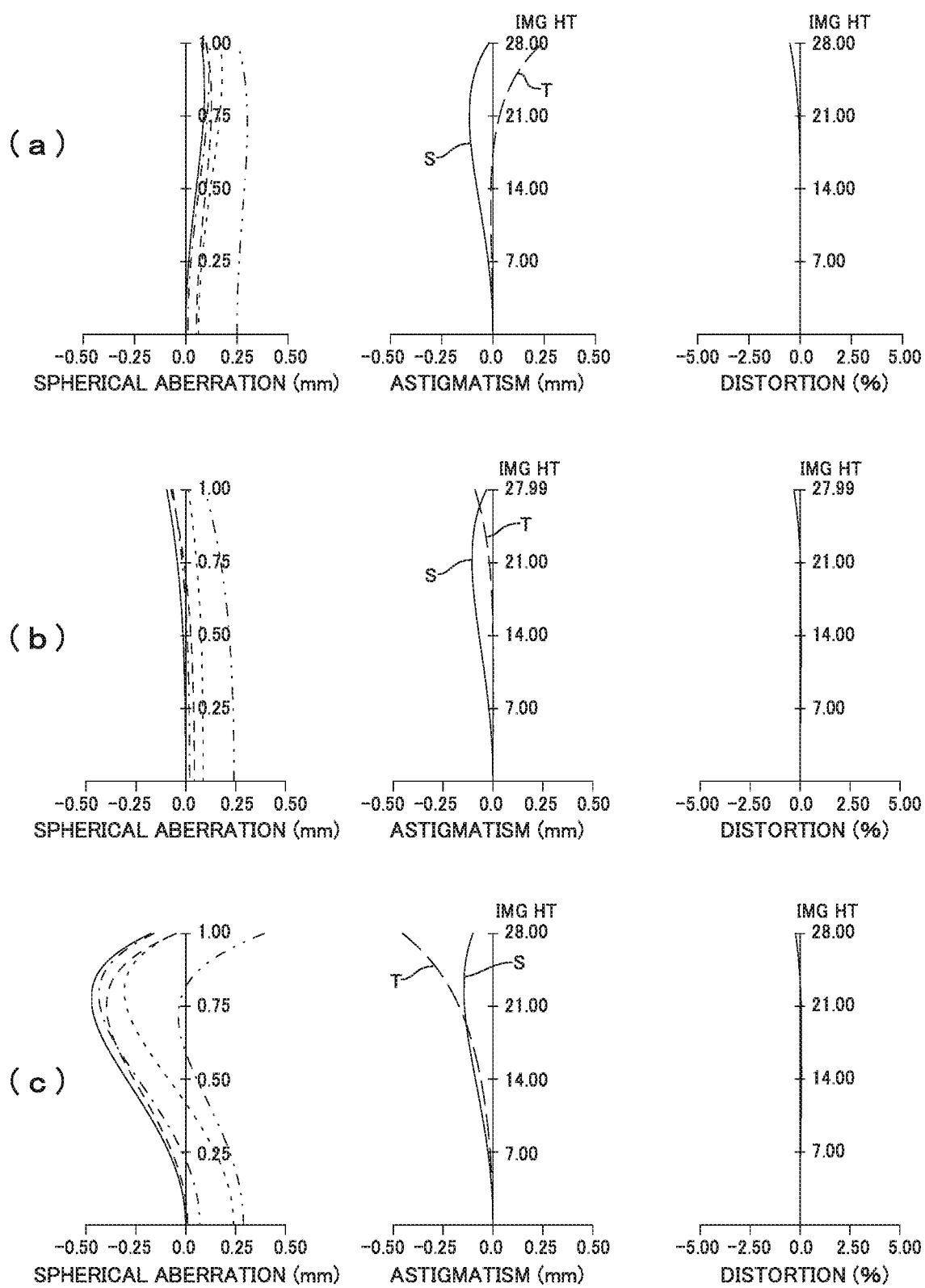
FIG. 16 depicts various aberrations at each object distance for the optical system shown in FIG. 13.

As described above, this optical system 10 has a magnification of 0.5 at the closest (shortest distance) and a focal length of 120 mm, and therefore performs as a telephoto-type macro lens. Conditions (1), (2), and (4) given earlier are satisfied. The cemented lens B1 of the second lens group G2 satisfies Condition (3), and the lens L41 of the fourth lens group G4 satisfies Condition (5). This means that it is possible to provide an optical system 10 which, while having a simple configuration with a total of 11 lenses, performs as a telephoto-type macro lens, further improves the aberration correction performance by disposing the cemented lens B4 in the sixth lens group G6, and, as depicted in FIG. 16, favorably corrects various aberrations at each object distance.

In this way, the various optical systems (lens systems) 10 disclosed above are all compact, large-aperture optical systems 10 that relate to image pickup (image capturing, imaging) optical devices and digital appliances, and are suited to interchangeable lens digital cameras, video cameras, TV cameras, action cameras and the like that photograph the landscape or an object using an image pickup element. These optical systems are especially suitable as a lens system with a large image circle to be used with a large image capture sensor 5. It is possible to provide an optical system 10 that has a short overall length LA, is bright and wide angle, favorably corrects aberrations, and performs as a telephoto-type macro lens in spite of having a simple configuration composed of 10 or 11 lenses.

The invention claimed is:
1. An optical system for image pickup consisting of a first refractive optical system disposed on an object side with respect to an aperture stop and a second refractive optical system disposed on an image plane side with respect to the aperture stop, wherein the first refractive optical system includes, in order from the object side, a first lens group with positive refractive power, a second lens group with positive refractive power, and a third lens group with negative refractive power, wherein the first refractive optical system lacks any other lens between the first lens group and the second lens group and the first refractive optical system lacks any other lens between the second lens group and the third lens group, wherein the first lens group is located closer to the object side than any other lens in the optical system, wherein the third lens group is located closer to the aperture stop than any other lens on the object side of the aperture stop, the second refractive optical system includes, in order from the object side, a fourth lens group with positive refractive power, a fifth lens group with positive refractive power, and a sixth lens group with negative refractive power, wherein the second refractive optical system lacks any other lens between the fourth lens group and the fifth lens group and the second refractive optical system lacks any other lens between the fifth lens group and the sixth lens group, wherein the sixth lens group is located closer to the image plane side than any other lens in the optical system, wherein the fourth lens group is located closer to the aperture stop than any other lens on the image plane side of the aperture stop, and when focusing from infinity to a short distance, the first lens group, the third lens group, and the sixth lens group do not move with respect to the aperture stop and the second lens group and the fourth lens group move toward the object side.

2. The optical system according to claim 1, wherein the second lens group includes a first cemented lens and an amount of movement PF1 of the second lens group during focusing and an amount of movement PB1 of the fourth lens group during focusing satisfy a following condition:

$1 < PB1/PF1 < 8$.

3. The optical system according to claim 2, wherein the amount of movement PF1 and an overall length AL of the optical system satisfy a following condition:

$0.05 < PF1/AL < 0.15$.

4. The optical system according to claim 2, wherein the first cemented lens includes a lens L21 with positive refractive power and a lens L22 with negative refractive power, and a refractive index nd21 and an Abbe number vd21 of the lens L21 and a refractive index nd22 and an Abbe number vd22 of the lens L22 satisfy the following conditions:

$1.45 < nd21 < 1.65$ $1.65 < nd22 < 1.85$ $65 < vd21 < 85$ $20 < vd22 < 40$.

5. The optical system according to claim 2, wherein an image plane side surface of the first cemented lens is a surface that is concave on the image plane side, and the second lens group includes a lens with an object side surface that is convex toward the object side and is adjacent to the image plane side surface of the first cemented lens with a minimum air gap in between.

6. The optical system according to claim 2, wherein the amount of movement PB1 and the overall length AL of the optical system satisfy the following condition:

$0.15 < PB1/AL < 0.40$.

7. The optical system according to claim 1, wherein the fourth lens group is composed of a single lens L41 with positive refractive power.

8. The optical system according to claim 7, wherein a refractive index nd41 and an Abbe number vd41 of the lens L41 satisfy the following conditions:

$1.40 < nd41 < 1.60$ $70 < vd41 < 90$.

9. The optical system according to claim 1, wherein the fifth lens group includes a cemented lens and moves during focusing.

10. The optical system according to claim 1, wherein the third lens group is composed of a single cemented lens and the fifth lens group is composed of a single cemented lens.

11. The optical system according to claim 10, wherein the first lens group is composed of a single-lens with positive refractive power, and the sixth lens group is composed of a single cemented lens or a single lens with negative refractive power.

12. The optical system according to claim 1, wherein the first lens group is composed of a single lens with positive refractive power, the second lens group is composed, in order from the object side, of one cemented lens and a single lens with positive refractive power, the third lens group is composed of one cemented lens, the fourth lens group is composed of a single lens with positive refractive power, the fifth lens group is composed of a single cemented lens, and the sixth lens group is composed of a single cemented lens or a single lens with negative refractive power.

13. An image pickup apparatus comprising:
an optical system according to claim 1; and
an image pickup element disposed on the image plane side of the optical system.

14. An optical system for image pickup, wherein the optical system consists of:
a first refractive optical system disposed on an object side with respect to an aperture stop; and
a second refractive optical system disposed on an image plane side with respect to the aperture stop;
wherein the first refractive optical system consists of, in order from the object side:
a first lens group with positive refractive power;
a second lens group with positive refractive power; and
a third lens group with negative refractive power,
wherein the second refractive optical system consists of, in order from the object side:
a fourth lens group with positive refractive power;
a fifth lens group with positive refractive power; and
a sixth lens group with negative refractive power;
wherein, when focusing from infinity to a short distance, the first lens group, the third lens group, and the sixth lens group do not move with respect to the aperture stop and the second lens group and the fourth lens group move toward the object side.

15. An image pickup apparatus comprising:
an optical system according to claim 14; and
an image pickup element disposed on the image plane side of the optical system.

16. The optical system according to claim 14, wherein the fifth lens group moves during focusing.

17. The optical system according to claim 14,
wherein an amount of movement PB1 of the fourth lens and an overall length AL of the optical system satisfy the following condition:

$$0.15 < PB1/AL < 0.40.$$

18. The optical system according to claim 14,
wherein the fourth lens group is composed of a single lens L41 with positive refractive power, and
a refractive index nd41 and an Abbe number vd41 of the lens L41 satisfy the following conditions:

$$1.40 < nd41 < 1.60$$

$$70 < vd41 < 90.$$

* * * * *